May 10, 1938.  O. W. HEISE  2,116,628
PRESSURE GAUGE
Filed June 3, 1936
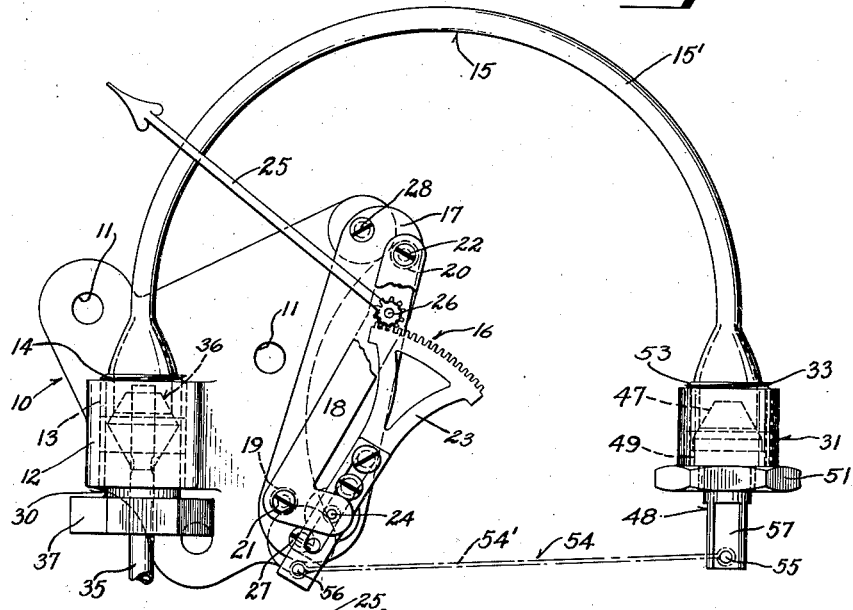
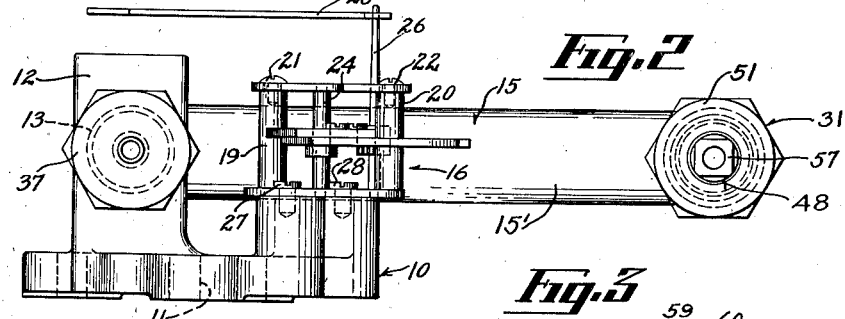
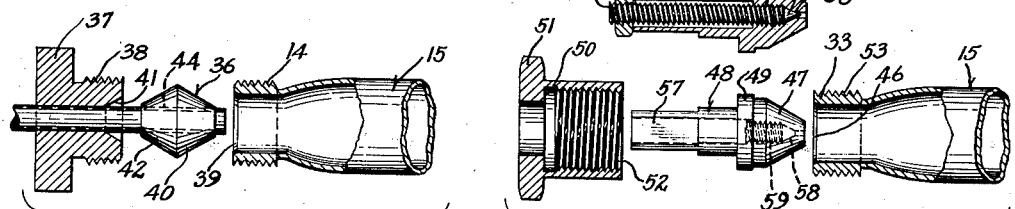
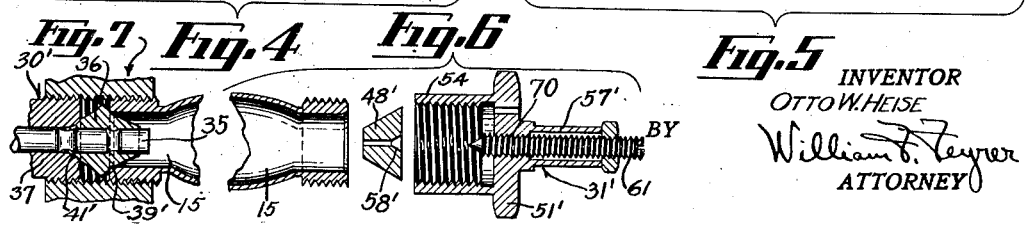
INVENTOR
OTTO W. HEISE
BY William F. Teyrer
ATTORNEY Patented May 10, 1938

2,116,628

UNITED STATES PATENT OFFICE 2,116,628

PRESSURE GAUGE

Otto W. Heise, Bridgeport, Conn.

Application June 3, 1936, Serial No. 83,188

7 Claims. (Cl. 73—109)

This invention relates to pressure gauges, such as those in which a Bourdon tube is used, and especially to highly efficient and leakproof gauges of this type. The construction of pressure gauges always presents special problems because in these structures it is necessary to confine high pressures in parts of relatively small size. Also, it is highly important to have such gauges absolutely leakproof since any escape of pressure renders the structure inaccurate in its readings and therefore practically worthless, or at least defeats the real intent of the device.

Heretofore, there have been many efforts towards producing a high quality accurate and leakproof pressure gauge. In nearly all of these previous efforts very accurate machining of parts was required and in nearly all of these structures it was necessary to use solder.

In those gauges where solder is used to secure the parts together or to render the connection thereof leakproof there is great danger of the inadvertent release of the solder and breakage of such leakproof connection when the gauge is subjected to heat. Also, any gauge depending upon solder to make a leakproof connection between the parts thereof cannot be used in lines containing materials of high temperature and cannot be used in locations such as near boilers or furnaces where there is considerable heat, because of the relatively low melting point of the solder. These disadvantages of solder are also prevalent in mercury boilers and the like since mercury quickly attacks and dissolves or disintegrates the solder. A disadvantage similar to the latter is also prevalent when the gauge is used in lines of oil refineries and the like where organic and inorganic impurities adversely attack material such as solder.

Under some circumstances a melting, slow disintegration, or eating away of the solder, might not cause any disadvantage. However, in devices such as the present one where such disintegration is followed by great pressure, sometimes 10,000 lbs. per square inch and greater, a leak which will result in an inaccurate reading may occur. There is also the danger of a substantially complete release of the pressure and explosion of the complete pressure gauge. It is not an unusual occurrence for a pressure gauge and the glass plate in the frame thereof to be shattered with possible harm and damage to nearby persons and property.

From the foregoing it will be apparent that from the viewpoint of accuracy and safety it is highly desirable to provide a pressure gauge with close interfitting or associated parts which are leakproof in order to provide a highly accurate and safe pressure gauge. Otherwise the laborious careful and costly work of calibrating the gauge would be entirely defeated the moment a small leak occurs.

In view of the impossibility to use solder in pressure gauges subject to high temperature it has been necessary to weld unions securely, even though parts were brought together by screw threads or the like, in an effort to render the unions absolutely leakproof. However, such welded structures cannot be disassembled for cleaning, adjustments or replacements of parts. Therefore, pressure gauges were often used when containing sediment, with the adverse result that inaccurate readings were obtained. Also, with such structures, it was necessary very often to replace an entire costly gauge because of the inability to replace some small part of the welded together gauge.

It is an important object of the present invention to provide a pressure gauge obviating the shortcomings set forth above and to provide one which is more efficient and accurate in its operation than those gauges heretofore proposed.

In particular it is an object of the present invention to provide a pressure gauge with close fitting or thoroughly associated parts which are absolutely leakproof and in which no solder is required to achieve this end.

It is another important object of the present invention to provide a pressure gauge with interconnecting parts adapted to be disassembled with ease for cleaning purposes, and for the purpose of adjustments, and which will have the characteristic of maintaining an accurate and pressure tight relationship between the various parts when reassembled; thus, dispensing with the usual operation of again calibrating the instrument.

Features flowing from the accomplishment of these objects include the provision of a base member forming a chamber inclosing a double tapered sleeve which may be wedged, or partially mushroomed, into the mouth of the Bourdon tube and which will be compressed onto the tubing leading to the Bourdon tube and the provision of a single tapered sleeve mushroomed into the other end of the Bourdon tube; all of which serve to provide a very leakproof and highly efficient pressure gauge.

In the drawing, which is illustrative of the present preferred form of the invention:

Figure 1 is a plan view of the internal mechanism of a Bourdon tube gauge, with the present invention included therein.

Fig. 2 is a bottom view of the gauge shown in Fig. 1.

Fig. 3 is a sectional view of the sealing plug at the outer end of the gauge.

Fig. 4 is an exploded view partly in section of the novel union, provided by the present invention for the inner end of the gauge.

Fig. 5 is an exploded view of the plug for the outer end of the gauge, partly in section.

Fig. 6 is an exploded view, in section, of a modified form of sealing plug for the outer end of the gauge.

Fig. 7 is a sectional view of a modified form of inner end connection in closed position.

Referring now in detail to the drawing, the present invention is illustrated as comprising a base 10 of irregular form which may be secured to a wall or to a pressure gauge casing as by screws (not shown) passed through holes 11. Preferably the base 10 is provided with an upstanding lug 12 having a threaded bore 13 adapted to receive a threaded inner end 14 of a Bourdon tube 15.

A pointer mechanism 16 comprising plates 17 and 18 held in spaced relation by rods 19 and 20 with screws 21 and 22 respectively serves to support a movable segment 23 on a pivoted rod 24 and a movable pointer 25 on a pivoted rod 26. Screws 27 and 28 hold the pointer mechanism on the base 10. The pointer 25 cooperates with a calibrated scale, which for simplicity, is omitted from the present showing.

The present invention provides novel and highly desirable leakproof connections 30 and 31 at inner and outer ends 14 and 33 respectively of the Bourdon tube 15 for locating, supporting and securing the Bourdon tube relative to the base and relative to the pointer mechanism 16.

The connection 30 in its present preferred form comprises the threaded bore 13 in the upstanding lug 12 adapted to receive the threaded inner end 14 of the Bourdon tube 15. Because a looped section 15' of the Bourdon tube clears the base substantially it is possible to screw the end 14 into the bore 13 any desired extent. The remaining parts of the connection 30 comprise a feed tube 35 adapted to enter the other side of the threaded bore 13 carrying a double tapered sleeve 36 and a clamping member 37 having a thread 38.

Now of particular importance and as may be seen best in Figs. 1 and 4, to prevent the Bourdon tube 15 from turning in the lug 12 and particularly to provide a leakproof connection 30, the inner end 14 of the Bourdon tube 15 is provided with a bevelled face 39 adapted to receive a tapered wall 40 and the clamping member 37 is provided with a bevelled face 41 adapted to receive a tapered wall 42 on the double tapered sleeve 36. This construction is such that the tapers 40 and 42 on the double tapered sleeve 36 are securely pressed onto the bevelled faces 39 and 41 respectively when the clamping member 37 is tightened, as shown in Fig. 1. At the same time the bevelled faces 39 and 41 press the tapered walls 40 and 42 causing the underlying inner wall 44 of the bore of the tapered sleeve 36 to press down and grip the feed tube 35 at both ends of the sleeve. This structure thus provides a secure and thoroughly leakproof connection, without soldering or welding.

A modified connection 30' is shown fragmentarily in Fig. 7, differing from the connection 30 only in the provision of convex bevelled faces 39' and 41' on the Bourdon tube 15 and the clamping member 37 respectively, which have the characteristic of effecting a greater deformation of the sleeve 36 and causing the ends of the latter to press into the feed tube 35 a greater extent.

The connections 30 and 30' at the inner end of the Bourdon tube 15 are fully disclosed and claimed in my copending divisional application Serial No. 199,800 filed April 4, 1938.

The complementary connection 31 in its preferred form is shown best in Figs. 1 and 5. It comprises a bevelled face 46 on the outer end 33 of the Bourdon tube 15 adapted to receive a tapered wall 47 of a tapered plug 48. Preferably the plug is provided with a flange 49 adapted to be backed and pushed by a shoulder 50 of a cap 51. A thread 52 and 53 on the cap 51 and outer end 33 respectively serve to securely press the tapered wall 47 onto the bevelled face 46 to make a leakproof connection.

When the connection 31 is completed, as shown in Fig. 1 a connecting mechanism 54 comprising a link 54' looping pins 55 and 56 respectively on an extension 57 of the plug 48 passing outwardly through an aperture in cap 51 and on the segment 43, serves to operate the pointer 25 upon each pressure change or response in the loop section 15' of the Bourdon tube.

Preferably the plug 48 is provided with a bevelled outlet port 58 and threaded bore 59 adapted to receive a bevelled point 60 and thread screw 61 respectively, in order to open the Bourdon tube 15 to the atmosphere, usually for clearing an accumulation of air. The entire connections 30 and 31 can be completely disassembled for clearing out an accumulation of scales, sediment or the like, without difficulty.

Fig. 6 shows a modified form of connection 31', differing from the connection 31 mainly in the provision of a short bevelled plug 48' having a bevelled port 58' and the provision of the port controlling screw 61 in a slightly modified cap 51', the latter having a threaded screw receiving opening 70 in alignment with the port 58', and having an extension 57' integral therewith for the connecting mechanism 54.

Preferably the double tapered sleeve 36 is made of softer material than the Bourdon tube 15 so that it may be pressed toward and onto the feed tube 35 when the clamping member 37 is tightened. For example, the sleeve may be of brass or the like while the Bourdon tube is made of steel or the like. Similarly the bevelled plugs 48 and 48' may be made of softer material than the Bourdon tube and the caps or clamping members 51 and 51'. If preferred the bevelled faces 39 and 46 on the Bourdon tube 15 and the bevelled faces 41 on the clamping members 37 may be omitted for economy in manufacturing, however, a bevelled face, especially if machined and lapped, insures a stronger and more leakproof connection.

Other variations and modifications may be made within the scope of this invention and portions of the improvements may be used without others.

Having thus described the invention, what is claimed as new is:

1. In a pressure gauge the combination of a base; a Bourdon tube having an outer free end; a bevelled face on the outer end of the Bourdon tube; a bevelled plug adapted to cooperate with the bevelled face, and having a bevelled port; a cap compressing and holding said bevelled plug on said bevelled face, said cap having an aperture therethrough for placing the Bourdon tube in communication with the atmosphere; and bevelled means on said cap, cooperating with said bevelled port, for opening and closing said port.

2. In a pressure gauge the combination of a base; a Bourdon tube having an outer free end; a bevelled face on the outer end of the Bourdon tube; a bevelled plug adapted to cooperate with the bevelled face, and having a bevelled port; a cap compressing and holding said bevelled plug on the bevelled face, said cap having an aperture therethrough for placing the Bourdon tube in communication with the atmosphere; and bevelled means associated with said bevelled port for opening and closing said port.

3. In a pressure gauge the combination of a base; a Bourdon tube having an inner and an outer end; means connecting the inner end of the Bourdon tube to the base; a bevelled face on the outer end of said Bourdon tube; a bevelled plug having a port; a cap securing said bevelled plug to said bevelled face, said cap having an aperture therethrough for placing the Bourdon tube in communication with the atmosphere; and means associated with said plug for opening and closing said port.

4. In a pressure gauge the combination of a Bourdon tube having an outer free end; a bevelled plug engageable with said free end and having a port; a cap having a threaded connection with said Bourdon tube for urging the bevelled plug into firm sealing engagement with the free end thereof, and having a threaded opening in alignment with said port for placing the Bourdon tube in communication with the atmosphere; and a screw insertable in said threaded opening for controlling said port.

5. In a pressure gauge the combination of a Bourdon tube having an outer free end; an apertured cap having a threaded connection with said Bourdon tube; an internal shoulder on said cap; a plug having a tapered wall and having a backing flange cooperable with said cap shoulder to force the tapered wall into firm sealing engagement with said free end; and an extension on said plug, extending outwardly from said cap through the aperture therein.

6. In a pressure gauge the combination of a Bourdon tube having an outer free end; an apertured cap having a threaded connection with said Bourdon tube; an internal shoulder on said cap; a plug having a tapered wall and having a port therein; a backing flange on said plug cooperable with said cap shoulder to force the tapered wall into firm sealing engagement with said free end; an extension on said plug, extending outwardly from said cap through the aperture therein; and means insertable in said extension for controlling said plug port.

7. In a presssure gauge the combination of a Bourdon tube having an outer free end; an apertured cap having a threaded connection with said Bourdon tube; an internal shoulder on said cap; a plug having a tapered wall and having a port therein; a backing flange on said plug cooperable with said cap shoulder to force the tapered wall into firm sealing engagement with said free end; an extension on said plug, extending outwardly from said cap through the aperture therein; and a screw insertable in said extension for controlling said plug port.

OTTO W. HEISE.